US006768056B2

United States Patent
Fischer et al.

(10) Patent No.: US 6,768,056 B2
(45) Date of Patent: Jul. 27, 2004

(54) CAPACITOR HOUSING

(75) Inventors: Edmund Fischer, Behlingen (DE);
Rainer Hebel, Heidenheim (DE);
Thomas Kopp, Königsbronn (DE);
Wilhelm Schweikert, Heidenheim (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 10/416,601

(22) PCT Filed: Nov. 15, 2001

(86) PCT No.: PCT/DE01/04309
§ 371 (c)(1),
(2), (4) Date: Dec. 10, 2003

(87) PCT Pub. No.: WO02/41340
PCT Pub. Date: May 23, 2002

(65) Prior Publication Data
US 2004/0080898 A1 Apr. 29, 2004

(30) Foreign Application Priority Data
Nov. 15, 2000 (DE) .......................... 100 56 474

(51) Int. Cl.⁷ ................................ H05K 5/02
(52) U.S. Cl. ........................ 174/50; 174/58; 174/60; 174/135; 220/4.02; 248/906; 439/535
(58) Field of Search ................ 174/50, 58, 60, 174/135; 220/4.02, 3.8; 439/535; 248/906

(56) References Cited

U.S. PATENT DOCUMENTS

| 5,533,637 A | * | 7/1996 | Williams, Jr. ............... 220/3.8 |
| 5,738,539 A | * | 4/1998 | Caveney et al. ............ 439/535 |
| 6,218,613 B1 | * | 4/2001 | Justiniano et al. ........... 174/50 |
| 6,543,940 B2 | * | 4/2003 | Chu ............................ 385/53 |
| 6,545,217 B2 | * | 4/2003 | Sato ............................ 174/50 |
| 6,548,755 B2 | * | 4/2003 | Wu .............................. 174/50 |
| 6,563,046 B1 | * | 5/2003 | Jarry et al. ................... 174/50 |
| 6,708,834 B2 | * | 3/2004 | Hagerman, III ........... 220/4.02 |

FOREIGN PATENT DOCUMENTS

| DE | 39 16 899 | 11/1990 |
| DE | 42 02 824 | 8/1993 |
| DE | 196 13 765 | 10/1997 |
| DE | 200 10 318 | 10/2000 |

* cited by examiner

Primary Examiner—Dhiru R Patel
(74) Attorney, Agent, or Firm—Fish & Richardson P.C.

(57) ABSTRACT

A capacitor housing includes an electrically conductive cup having a wall and a bottom, and an electrically insulating envelope which substantially covers an exterior of the cup and which includes an opening at a bottom of the cup. The opening is smaller than the bottom of the cup. The capacitor housing also includes a fill element which is substantially heat-conductive and disposed inside the opening and a cover element which is substantially electrically insulating, that covers at least part of the bottom of the cup and overlaps at least part of the envelope.

23 Claims, 2 Drawing Sheets

CAPACITOR HOUSING

CROSS-REFERENCE TO RELATED APPLICATIONS

This application claims priority to PCT Application No. PCT/DE01/04309, filed on Nov. 15, 2001, and to German Patent Application No. 100 56474.7, filed on Nov. 15, 2000.

FIELD OF THE INVENTION

The invention relates to a housing comprising an electrically conductive cup having a wall, a bottom, and an electrically insulating envelope. The electrically insulating envelope covers an exterior of the cup and features an opening on a bottom of the cup that is smaller than the bottom of the cup. The invention also relates to a structure of the housing, an electrolytic capacitor, and a structure of the electrolytic capacitor.

BACKGROUND

Conventional housings that may be used for electrolytic capacitors are typically made of aluminum. Electrolytic capacitors are attached to printed circuit boards, either individually or in batteries. Because the potential of an anode or a cathode of a capacitor is normally applied to an aluminum housing of the capacitor, the housing must be electrically insulated toward its exterior. In particular, a housing whose bottom is attached to a printed circuit board must be electrically insulated vis-à-vis the printed circuit board. This electrical insulation is achieved via an insulating envelope.

When high current is applied to an aluminum electrolytic capacitor, heat is generated that must be dissipated to its exterior. Improved heat dissipation from the capacitor increases the maximum current carrying capacity of the capacitor. Consequently, in capacitor batteries, for example, the number of capacitors in a battery can be reduced without changing the overall current carrying capacity of the battery.

Housings are known that are insulated on their bottoms. In particular, the bottom of a housing cup may be insulated via a plastic disk made, for example, of PVC. The housing is subsequently encased with a heat-shrinkable sleeve. This heat-shrinkable sleeve corresponds to the electrically insulating envelope of the cup. When such a cup is mounted on a printed circuit board, a planar air gap is created at the bottom of the cup. The planar air gap is a very poor heat conductor and, therefore, impairs heat dissipation from the housing through the printed circuit board. The plastic disk disposed on the bottom of the cup is also a poor heat conductor.

Heat dissipation from a housing through the bottom of a cup can be improved by the structured described in DE 296 17 888 U1. According to this document, the bottom of the cup includes a step that forms a centrally disposed elevation that is smaller than the cup diameter. The cup is encased in a heat-shrinkable sleeve up to this step, and is then insulated with a thermally conductive foil that covers the entire surface of the bottom.

However, because the cup is an extruded aluminum part, the step bottom is formed as a solid piece. As a result, a large quantity of aluminum material is needed to produce the cup. The use of this cup as a housing for aluminum electrolytic capacitors is also disadvantageous since a solid cup bottom provides poor control over gas development during operation of the capacitor and resulting pressure-related deformation of the cup. As a result, the solid cup bottom can create a bulge and thereby create air gaps over a large surface area. These air gaps poorly dissipate heat and cannot be offset by the thermally conductive foil on the bottom of the cup.

Another disadvantage of known housings is that when the heat-shrinkable sleeve is applied, the sleeve must be prevented from covering the step. This is because the step bottom determines the final dimensions of the heat-shrinkable sleeve and it is very difficult to conform to fixed heat-shrinkable sleeve dimensions, particularly those of the segment oriented toward the center of the housing. The sleeve is prevented from covering the step using a complicated heat-shrinking process.

SUMMARY

Therefore, an objective of the present invention is to provide a housing that features effective electrical insulation and effective heat dissipation on its bottom, and that can be easily manufactured.

According to the invention, this objective is achieved with a housing pursuant to claim 1. Additional embodiments of the invention, a housing structure, an electrolytic capacitor with the housing, and a structure of the electrolytic capacitor, are disclosed in the remaining claims.

The invention is directed to a housing with an electrically conductive cup. The invention comprises a wall, a bottom, and an electrically insulating envelope. The envelope covers the exterior of the cup and features an opening on a bottom of the cup that is smaller than the bottom of the cup. A fill element that effectively conducts heat is disposed inside the opening. A covering element, which is electrically insulating, covers the bottom of the cup and overlaps the envelope.

Because of the fill element disposed on the bottom which conducts heat well, or because of the covering element which is electrically insulating, the housing of the invention features, on its bottom, both effective heat conductance and effective electrical insulation. Because the opening created on the bottom as a result of the electrically insulating envelope is filled with the fill element, a step bottom in the cup is not needed. Thus, advantageously, the housing of the invention can be equipped with a cup with a flat bottom that can be manufactured as an extruded part inexpensively and using relatively little material. As a result of the fill element, an air gap between the bottom of the housing and a printed circuit board supporting the housing is at least considerably reduced if not entirely eliminated.

Moreover, because the fill element can be disposed at any point on the cup bottom, the configuration of the electrically conductive envelope and, in particular, the position of the opening can be flexibly selected. This is particularly advantageous with poorly controllable processes for manufacturing a suitable electrically insulating envelope, such as heat-shrinkable sleeves.

Furthermore, because the cover element overlaps with the envelope of the cup, effective electrical insulation is provided between the housing bottom and a printed circuit board. The overlap between the cover element and the envelope creates a long creep path, which must be overcome by electrical surface currents.

The housing is therefore especially suitable for a housing structure in which the entire surface of the bottom of the cup of the housing is pressed against a substrate surface. This is also an object of the invention. As a result of planar contact between the bottom and the substrate surface, the heat created in the housing during operation of, e.g., an electric element disposed therein, can be effectively transferred to the substrate surface and, therefore, to the substrate for further dissipation.

In this arrangement, the fill element can be designed to be elastically ductile, which is especially advantageous if the housing is to be designed to be mounted onto a substrate surface, which provides for the cup bottom being pressed onto the substrate surface. As a result of the pressure being applied or because of deformation of the cup as a result of elevated pressure inside the cup, an elastically ductile fill element can compensate for any remaining air gaps. This effect can be amplified even further if the cover element is also designed to be elastically ductile.

Moreover, to further reduce the size of the air gap, caused by the opening in the electrically insulating envelope, between the housing and a substrate surface disposed beneath it, it is advantageous if the fill element fills at least 80% of the area of the opening. Heat dissipation from the housing can be effectively improved as a result. To obtain the best possible heat dissipation from the housing, it is also advantageous if the fill element is executed in the shape of a disk, the thickness of which deviates from the thickness of the envelope by less than 10%. This allows the bottom of the housing to be kept as flat as possible, which allows additional air gaps to be reduced.

The fill element can be, e.g., a braided metal material. The advantage of braided metal materials is that they are elastically ductile and are effective heat conductors.

However, the fill element can also be designed to be electrically insulating. In this case, in addition to providing effective heat conductance, the fill element fulfills the additional function of electrically insulating the cup bottom. Thermally conductive foil is an example of a material that can be used as a material for such a fill element. Thermally conductive foils are produced using silicon, for example, and are filled with ceramic material. For example, silicon rubber filled with bornitrit is known under the product names Sil-Pad or GAP-Pad, which are sold by the Bergquist Company. Suitable thermally conductive foils are also commercially available under the generic name of thermal silicon foils.

Thermally conductive foils, such as those described above, are advantageous in that they are elastically ductile, effective heat conductors, and electrically insulating. Since a fill element made with such a foil combines three functions into one element, its use is highly advantageous.

Effective electrical insulation of the housing can be achieved by designing the cover element in such a way that it covers the entire surface of the bottom of the cup. This results in the greatest possible overlap with the envelope and a maximum creep path for surface currents. These features improve the electrical insulation of the housing.

Depending on the application, the cover element can also feature an overlap relative to the bottom of the cup. The cover element can be, e.g., a foil made of polyester or polyvinylchloride. The advantage of these materials is that they are inexpensive to manufacture, are elastically ductile, and are effective insulators for electrically insulating the housing.

However, the cover element can also be designed to be effectively electrically insulating, which improves heat dissipation from the housing even further. A cover element made of a thermally conductive foil, as described above, is particularly suitable for this purpose.

Another advantageous embodiment of the invention is achieved by making the fill element and the cover element integral parts of a single insulating part, which exhibits effective thermally conductive properties and is, at the same time, electrically insulating. This reduces the number of parts needed to manufacture the housing. The insulating part can be made of a thermally conductive foil designed as a graduated part, the shape of which can be created by placing a fill element and a cover element on top of one another.

The electrically insulating envelope of the cup can be a heat-shrinkable sleeve that is shrink-wrapped onto the cup. Such shrink-wrapping of the cup with a heat-shrinkable sleeve is very inexpensive, fast, and easily achieved with simple means. However, the size of the opening on the bottom is very difficult to control with standard heat-shrinkable sleeve materials. For this reason, when a heat-shrinkable sleeve is used, the heat-shrinkable sleeve can be applied over only part of the cup bottom, depending on the desired overlap and, therefore, electrical insulation of the housing bottom. Subsequently, the remaining opening in the cup bottom can be filled with a suitably dimensioned fill element. Thus, in contrast to the use of a step bottom, the desired electrical insulation can be freely selected within wide limits, though at the cost of heat dissipation.

Advantageously, the cup of the housing can be produced via extrusion. The manufacturing process is inexpensive and easily and quickly executed, even for large numbers of units. Aluminum, for example, can be used as a conventional material for the cups manufactured by extrusion. Such an aluminum cup is ideally suited as a housing for an aluminum electrolytic capacitor in which a rounded coil is disposed in the interior of the cup. Such a capacitor is an additional object of the invention.

The use of the housing of the invention in an electrolytic capacitor is also advantageous in that gases produced during operation of an aluminum electrolytic capacitor and/or resulting pressure and associated deformation of the housing can be effectively offset by combining an elastic fill element with an elastic cover element.

Advantageously, such a capacitor can be attached to a flat substrate in a structure of the invention, wherein the bottom of the cup of the housing is two-dimensionally pressed onto the substrate surface. This creates advantages in terms of thermal contact between the capacitor housing and the substrate because, in the case of a cylindrical cup with a flat bottom, which is best suited for electrolytic capacitors with rounded coils, a maximum contact surface is achieved. In contrast, attaching the cup to the substrate by placing the cup onto the substrate would only establish a very small contact surface.

The following explains the invention in greater detail on the basis of exemplary embodiments and the corresponding figures.

DETAILED DESCRIPTION

Figure 1:
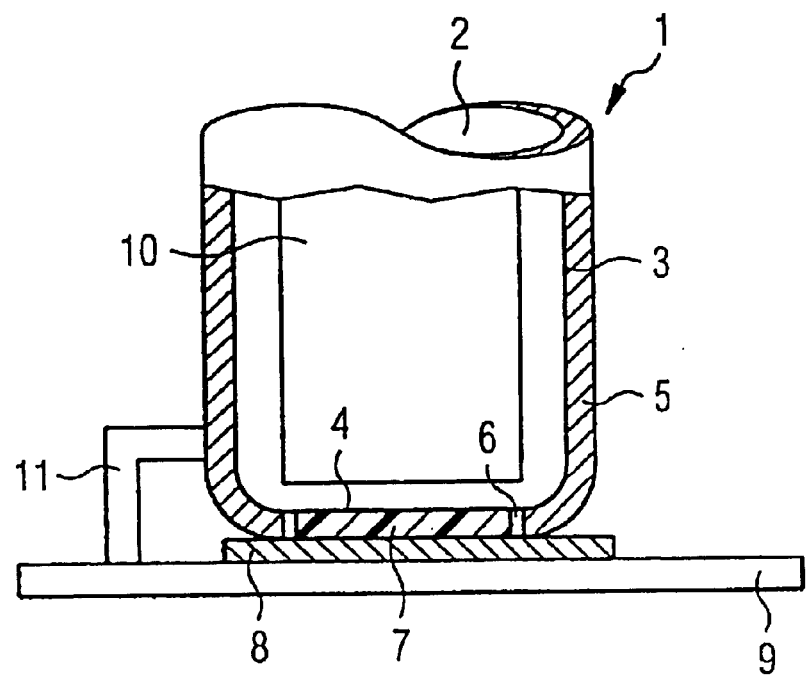
FIG. 1 depicts, by way of example, an inventive electrolytic capacitor structure with the inventive housing on a substrate.

FIG. 1 depicts an inventive housing structure with a housing 1. Housing 1 comprises a cup 2, in which a rounded coil 10 of an aluminum electrolytic capacitor is disposed. Cup 2 features a wall 3 and a flat bottom 4. Cup 4 is encased within an envelope 5, which is electrically insulating and which can be, e.g., a heat-shrinkable sleeve. Envelope 5 covers wall 3 and at least partially covers bottom 4 of cup 2.

Envelope 5 features an opening 6 on its bottom side, which opening 6 is smaller than bottom 4 of cup 2. A fill element 7 that can be, e.g., a braided metal material or a thermally conductive foil, is disposed in opening 6. Fill element 7 can be applied following application of envelope 5 to cup 2. If fill element 7 is a thermally conductive foil, the thermally conductive foil can be self-adhesive. Alternatively, the thermally conductive foil can also be glued to bottom 4 of cup 2.

On its bottom, housing 1 is covered with a cover element 8, which can be thermally conductive foil. The thermally conductive foil can be self-adhesive or it can be glued to fill element 7 and/or envelope 5.

Housing 1 is attached to a substrate 9 via a fastening element 11. Such attachment corresponds to mounting of an aluminum electrolytic capacitor onto a printed circuit board. Fastening element 11 is only depicted schematically and can be implemented as, e.g., a clip, as is known in the art, which is stretched around wall 3 of cup 2 and which is screwed to substrate 9.

Using fastening element 11, tensioning of bottom 4 of cup 2 on substrate 9 can also be achieved. This tensioning can result in additional reduction in air gaps, while at the same time improving thermal contact between housing 1 and substrate 9.

If cup 2 is cylindrical, the arrangement of housing 1 on substrate 9 depicted in FIG. 1 provides, as a result of planar mounting of bottom 4 of cup 2, a maximum possible contact surface between housing 1 and substrate 9. This arrangement provides effective heat dissipation from housing 1 to substrate 9.

Figure 2:
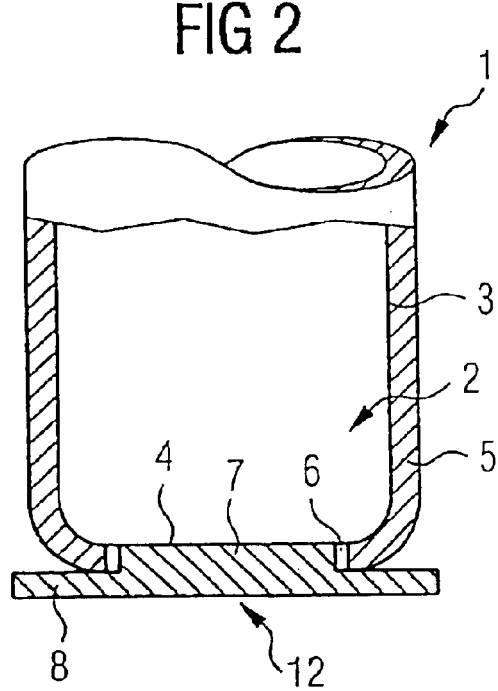
FIG. 2 depicts, by way of example, a cross-sectional view of the housing, in which the fill element and cover element are integrated into an insulating element, and in which the envelope is disposed between the bottom of the cup and the cover element.
Figure 3:
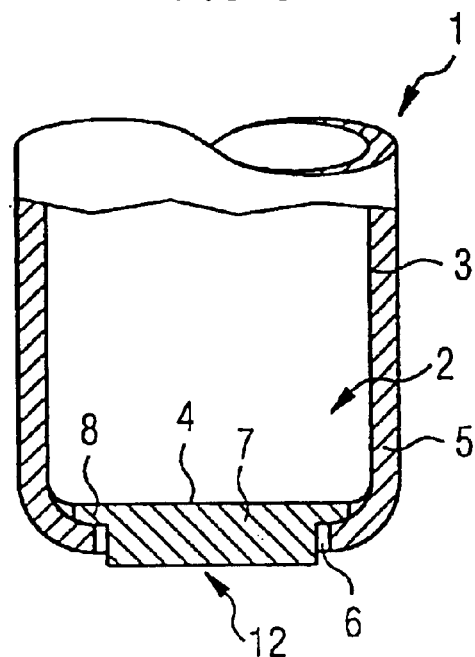
FIG. 3 depicts a housing pursuant to FIG. 2, in which the cover element is disposed between the envelope and the bottom of the cup.

FIG. 2 depicts a housing 1, which is similar to that depicted in FIG. 1, except that fill element 7 and cover element 8 are integral parts of an insulating element 12. Insulating element 12 is a thermally conductive foil with a step. According to FIG. 2, cup 2 can first be provided with envelope 5. Envelope 5 can be shrink-wrapped onto cup 2, after which insulating element 12 can be secured by gluing in opening 6 of insulating envelope 5. However, the reverse sequence is also possible; i.e., in which insulating element 12, as depicted in FIG. 3, is fastened to bottom 4 of cup 2 and subsequently is covered with envelope 5, such as a heat-shrinkable sleeve.

Figure 4:
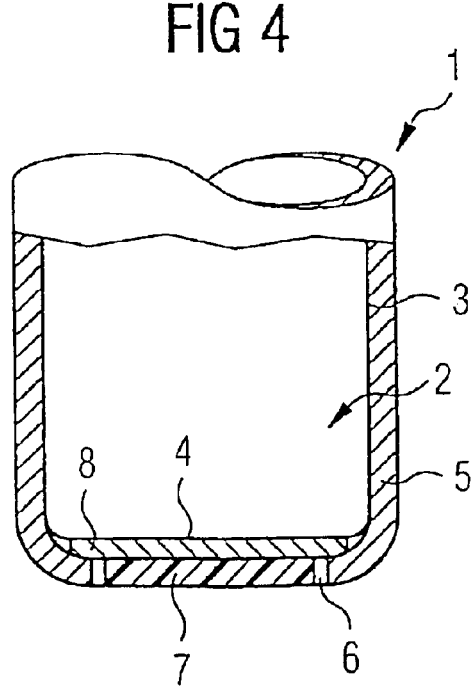
FIG. 4 depicts, by way of example, a cross-sectional view of the housing, in which the fill element and cover element are separate parts, and in which the cover element is disposed between the envelope and the bottom of the cup.

According to FIG. 4, cover element 8, which can be a separate part, can also be fastened first to bottom 4 of cup 2. Envelope 5, which may be a heat-shrinkable sleeve, can then be applied. Finally, opening 6, which is formed by envelope 5, can be filled using fill element 7.

The invention is not limited to the exemplary embodiments described herein. Instead, it is defined in its most general form by claim 1.

What is claimed is:

1. A housing comprising:
    an electrically conductive cup having a wall and a bottom;
    an electrically insulating envelope which substantially covers an exterior of the cup and which includes an opening at a bottom of the cup the opening being smaller than a said of the bottom of the cup;
    a fill element which is substantially heat-conductive and disposed inside the opening; and
    a cover element which is substantially electrically insulating, that covers at least part of the bottom of the cup and overlaps at least part of the envelope.
2. The housing according to claim 1, wherein the fill element is ductile.
3. The housing according to claim 2, wherein the fill element has a disk shape, and a thickness of the fill element differs from a thickness of the envelope by less than 10%.
4. The housing according to claim 1, wherein the fill element fills at least 80% of the opening.
5. The housing according to claim 1, wherein the fill element comprises a braided metal material.
6. The housing according to claim 1, wherein the fill element is electrically insulating.
7. The housing according to claim 6, wherein the fill element comprises the a thermally conductive foil.
8. The housing according to claim 6, wherein the fill element and the cover element are integral parts of an insulating element, the insulting a element being both heat-conductive and electrically insulating.
9. The housing according to claim 8, wherein the insulating element comprises a thermally conductive foil.
10. The housing according to claim 1, wherein the cover element is ductile.
11. The housing according to claim 1, wherein the cover element covers an entire surface of the bottom of the cup.
12. The housing according to claim 11, wherein the cover element overlaps the bottom of the cup.
13. The housing according to claim 1, wherein the cover element comprises a foil made of polyester or polyvinylchloride.
14. The housing according to claim 1, wherein the cover element is substantially heat-conductive.
15. The housing according to claim 14, wherein the cover element comprises a thermally conductive foil.
16. The housing according to claim 1, wherein the cover element is disposed between the envelope and the bottom of the cup.
17. The housing according to claim 1, wherein the envelope is disposed between the bottom of the cup and the cover element.
18. The housing according to claim 1, wherein the envelope comprises a heat-shrinkable sleeve that shrink-wraps the cup.
19. The housing according to claim 1, wherein the cup is manufactured by extrusion.
20. The housing according to claim 1, wherein the cup is cylindrical and the bottom of the cup is flat.
21. The housing structure comprising:
    a housing according to claim 1; and
    a flat substrate;
    wherein the bottom of the cup is pressed onto a surface of the flat substrate.
22. An electrolytic capacitor comprising:
    a rounded coil, and
    a housing according to claim 1;
    wherein the rounded coil is disposed in the cup.
23. An electrolytic capacitor according to claim 22, further comprising:
    a flat substrate, wherein the bottom of the cup is pressed onto a surface of the flat substrate.

* * * * *

UNITED STATES PATENT AND TRADEMARK OFFICE
CERTIFICATE OF CORRECTION

PATENT NO.      : 6,768,056 B2
DATED           : July 27, 2004
INVENTOR(S)     : Edmund Fischer et al.

It is certified that error appears in the above-identified patent and that said Letters Patent is hereby corrected as shown below:

Column 5,
Line 57, reads "a said of" replace with -- a size of --.

Column 6,
Line 15, reads "the a" delete "the".
Line 18, reads "insulting a" replace with -- insulating -- and delete "a".

Signed and Sealed this

Seventeenth Day of May, 2005

JON W. DUDAS
*Director of the United States Patent and Trademark Office*